United States Patent
Kim et al.

(10) Patent No.: US 7,110,065 B2
(45) Date of Patent: Sep. 19, 2006

(54) TRANSMISSIVE TYPE LIQUID CRYSTAL DISPLAY DEVICE WITH PHOTONIC CRYSTAL BALLS AND METHOD OF FABRICATING THE SAME

(75) Inventors: Gi Hong Kim, Kyonggi-do (KR); Young Seok Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 93 days.

(21) Appl. No.: 10/745,525

(22) Filed: Dec. 29, 2003

(65) Prior Publication Data
US 2004/0227874 A1   Nov. 18, 2004

(30) Foreign Application Priority Data
May 12, 2003   (KR) .................. 10-2003-0029828

(51) Int. Cl.
*G02F 1/1335* (2006.01)
(52) U.S. Cl. .................................. 349/106
(58) Field of Classification Search ............. 349/106
See application file for complete search history.

(56) References Cited

U.S. PATENT DOCUMENTS

| | | | | |
|---|---|---|---|---|
| 5,131,736 A | * | 7/1992 | Alvarez | 359/886 |
| 5,729,313 A | * | 3/1998 | Mitsui | 349/106 |
| 6,753,938 B1 | * | 6/2004 | Yamada et al. | 349/113 |
| 6,879,370 B1 | * | 4/2005 | Yokoue et al. | 349/190 |
| 2003/0218704 A1 | * | 11/2003 | Lee et al. | 349/106 |

* cited by examiner

*Primary Examiner*—Andrew Schechter
*Assistant Examiner*—Richard Kim
(74) *Attorney, Agent, or Firm*—Morgan, Lewis & Bockius, LLP

(57) ABSTRACT

A transmissive-type liquid crystal display (LCD) device includes lower and upper substrates facing each other, a thin film transistor array having a pixel electrode within each pixel region defined on the lower substrate, a black matrix layer on the upper substrate corresponding to portions of the lower substrate, except for the pixel electrode, a color filter layer on the upper substrate corresponding to the pixel electrode of the lower substrate, the color filter layer having photonic crystal balls for reflecting light, and a liquid crystal layer between the lower and upper substrates.

35 Claims, 4 Drawing Sheets

TRANSMISSIVE TYPE LIQUID CRYSTAL DISPLAY DEVICE WITH PHOTONIC CRYSTAL BALLS AND METHOD OF FABRICATING THE SAME

The present invention claims the benefit of Korean Patent Application No. P2003-29828 filed in Korea on May 12, 2003, which is hereby incorporated by reference.

BACKGROUND OF THE INVENTION

1. Field of the Invention

The present invention relates to a liquid crystal display (LCD) device and a method of fabricating an LCD device, and more particularly, to a transmissive-type LCD device and method of fabricating a transmissive-type LCD device.

2. Discussion of the Related Art

As demand for various display devices increases, efforts have been made to develop liquid crystal display (LCD) devices, plasma display panel (PDP) devices, electroluminescent display (ELD) devices, and vacuum fluorescent display (VFD) devices. Among these various flat display devices, the LCD devices have been commonly used as substitutes for cathode ray tube (CRT) devices due to their thin profiles, light weight, and low power consumption. In addition to mobile-type LCD devices, such as displays for notebook computers, the LCD devices have been developed for use in computer monitors and televisions to receive and display broadcasting signals.

Despite various technical developments within the LCD device technology, improved image quality of the LCD devices has been lacking. Accordingly, in order to use the LCD devices as general displays, providing images having high resolution and high luminance with a large-sized screen must be attained while still maintaining their thin profile, light weight, and low power consumption.

In general, a LCD device includes an LCD panel for displaying images and a driving part for supplying driving signals to the LCD panel. In addition, the LCD panel includes first and second glass substrates bonded to each other at a predetermined interval with a liquid crystal layer injected between the first and second glass substrates. The first glass substrate (i.e., TFT array substrate) includes a plurality of gate and data lines, a plurality of pixel electrodes, and a plurality of thin film transistors. The plurality of gate lines are formed along a first direction at fixed intervals, and the plurality of data lines are formed along a second direction perpendicular to the gate lines at fixed intervals, thereby defining a plurality of pixel regions. Accordingly, the plurality of pixel electrodes are formed within the pixel regions in a matrix configuration, and the plurality of thin film transistors are switched according to signals provided to the gate lines so as to supply signals of the data lines to the respective pixel electrodes.

The second glass substrate (i.e., color filter substrate) includes a black matrix layer for shielding portions of the first glass substrate, except for the pixel regions, from light. In addition, a red (R), green (G), and blue (B) color filter layer is provided for displaying various light colors, and a common electrode is used for producing an image.

The LCD device is driven according to optical anisotropy and polarizing characteristics of liquid crystal material. The liquid crystal material includes liquid crystal molecules, wherein each liquid crystal molecule has a long and thin structure to control an alignment direction of the liquid crystal molecules by inducing an electric field to the liquid crystal material. By controlling the alignment direction of the liquid crystal molecules, light passing through the liquid crystal material is refracted according to the alignment direction of the liquid crystal molecules by the optical anisotropy of the liquid crystal material, thereby displaying images.

Currently, active matrix LCD (AM-LCD) devices have been developed because of their high image resolution and ability to display moving images. The AM-LCD devices include a thin film transistor and a pixel electrode connected to the thin film transistor are arranged in a matrix configuration.

The LCD devices are commonly classified into transmissive-type LCD devices that display images by using an additional light source, such as a backlight, and reflective-type LCD devices that make use of ambient light. In the transmissive-type LCD devices, the backlight is provided below the LCD panel to control brightness of the LCD panel according to luminance of the backlight. Thus, the transmissive-type LCD devices are commonly used as monitor displays.

Hereinafter, a related art transmissive type LCD device will be described with reference to the accompanying drawings.

FIG. 1 is a plan view of a transmissive-type liquid crystal display (LCD) device according to the related art, and FIG. 2 is a cross sectional view along I–I' of FIG. 1 according to the related art. In FIGS. 1 and 2, a transmissive-type LCD device includes a lower substrate 10 having a TFT array, an upper substrate 20 having a color filter array, and a liquid crystal layer 25 between the lower and upper substrates 10 and 20.

As shown in FIG. 1, the lower substrate 10 includes a gate line 11, a data line 12, and a pixel electrode 13, wherein a gate electrode 11a protrudes from a predetermined portion of the gate line 11. In addition, the data line 12, which forms source/drain electrodes 12a and 12b, is formed in perpendicular to the gate line 11, whereby a pixel region is defined by a crossing of the gate and data lines 11 and 12 and the pixel electrode 13 is formed within the pixel region. Then, a semiconductor layer 14, which includes a channel region, is formed above the gate electrode 11a, and the source/drain electrodes 12a and 12b are disposed at both sides of the channel region in the semiconductor layer 14.

As shown in FIG. 2, a gate insulating layer 15 is formed along an entire surface of the lower substrate 10 including the gate electrode 11a and the gate line 11, whereby the semiconductor layer 14 is electrically insulated from the gate electrode 11a. In addition, a passivation layer 16 is formed along an entire surface of the lower substrate 10 including the source/drain electrodes 12a and 12b and the data line 12. Then, a contact hole is formed for exposing a portion of the drain electrode 12b so that the pixel electrode 13 is electrically connected with the drain electrode 12b. The gate insulating layer 15 and the passivation layer 16 may be formed of an inorganic insulating material, such as $SiO_x$ or $SiN_x$, or an organic insulating material having a low dielectric constant, such as polyamide compound.

The upper substrate 20 includes a black matrix layer 21 for shielding portions of the lower substrate 10, except for the pixel regions, from the light, a color filter layer 22 for displaying various colors corresponding to the respective pixel regions, and a common electrode 23 formed along an entire surface of the upper substrate 20 including the color filter layer 22.

In general, the transmissive-type LCD device uses the backlight as an inner light source, and the color filter layer 22 is formed of an absorbent-type pigment or dye. Thus, if the backlight emits light at an intensity of 100%, light having a specific wavelength is transmitted through respective red (R), green (G), and blue (B) portions of the color filter layer 22 at an intensity of 33%.

Accordingly, the transmissive-type LCD device according to the related art has the following disadvantages. First, during operation of the transmissive-type LCD device, the backlight requires high voltage to optimize the efficiency of the light emitted from the backlight. However, since the transmissive-type LCD device uses the absorbent-type color filter, the light emitted from the backlight is transmitted at an intensity of 33%. Thus, it is difficult to improve the light efficiency in the transmissive-type LCD device using the absorbing type color filter.

SUMMARY OF THE INVENTION

Accordingly, the present invention is directed to a transmissive-type liquid crystal display (LCD) device and method of fabricating a transmissive-type LCD device that substantially obviates one or more problems due to limitations and disadvantages of the related art.

An object of the present invention is to provide a transmissive-type LCD device having decreased power consumption and improved light efficiency.

Another object of the present invention is to provide a method of fabricating a transmissive-type LCD device having decreased power consumption and improved light efficiency.

Additional features and advantages of the invention will be set forth in the description which follows, and in part will be form the description, or may be learned from practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a transmissive-type liquid crystal display (LCD) device includes lower and upper substrates facing each other, a thin film transistor array having a pixel electrode within each pixel region defined on the lower substrate, a black matrix layer on the upper substrate corresponding to portions of the lower substrate, except for the pixel electrode, a color filter layer on the upper substrate corresponding to the pixel electrode of the lower substrate, the color filter layer having photonic crystal balls for reflecting light, and a liquid crystal layer between the lower and upper substrates.

In another aspect, a method of fabricating a transmissive-type liquid crystal display (LCD) device includes forming a thin film transistor array having a pixel electrode within each pixel region defined on a lower substrate, forming a black matrix layer on an upper substrate corresponding to portions of the lower substrate, except for the pixel electrode, forming a color filter layer on the upper substrate corresponding to the pixel electrode of the lower substrate, the color filter layer having photonic crystal balls for reflecting light, and forming a liquid crystal layer between the lower and upper substrates.

In another aspect, a color filter for transmitting and reflecting different first, second, and third wavelengths includes a first filter part having a first plurality of photonic crystal balls for reflecting light having the second and third wavelengths, and for transmitting light having the first wavelengths, a second filter part having a second plurality of photonic crystal balls for reflecting light having the first and third wavelengths, and for transmitting light having the second wavelengths, and a third filter part having a third plurality of photonic crystal balls for reflecting light having the first and second wavelengths, and for transmitting light having the third wavelengths.

In another aspect, a method of fabricating a color filter includes forming a first filter part having a first plurality of photonic crystal balls for reflecting light having first wavelengths and transmitting light having red wavelengths, forming a second filter part having a second plurality of photonic crystal balls for reflecting light having second wavelengths and for transmitting light having green wavelengths, and forming a third filter part having a third plurality of photonic crystal balls for reflecting light having third wavelengths and transmitting light having blue wavelengths.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
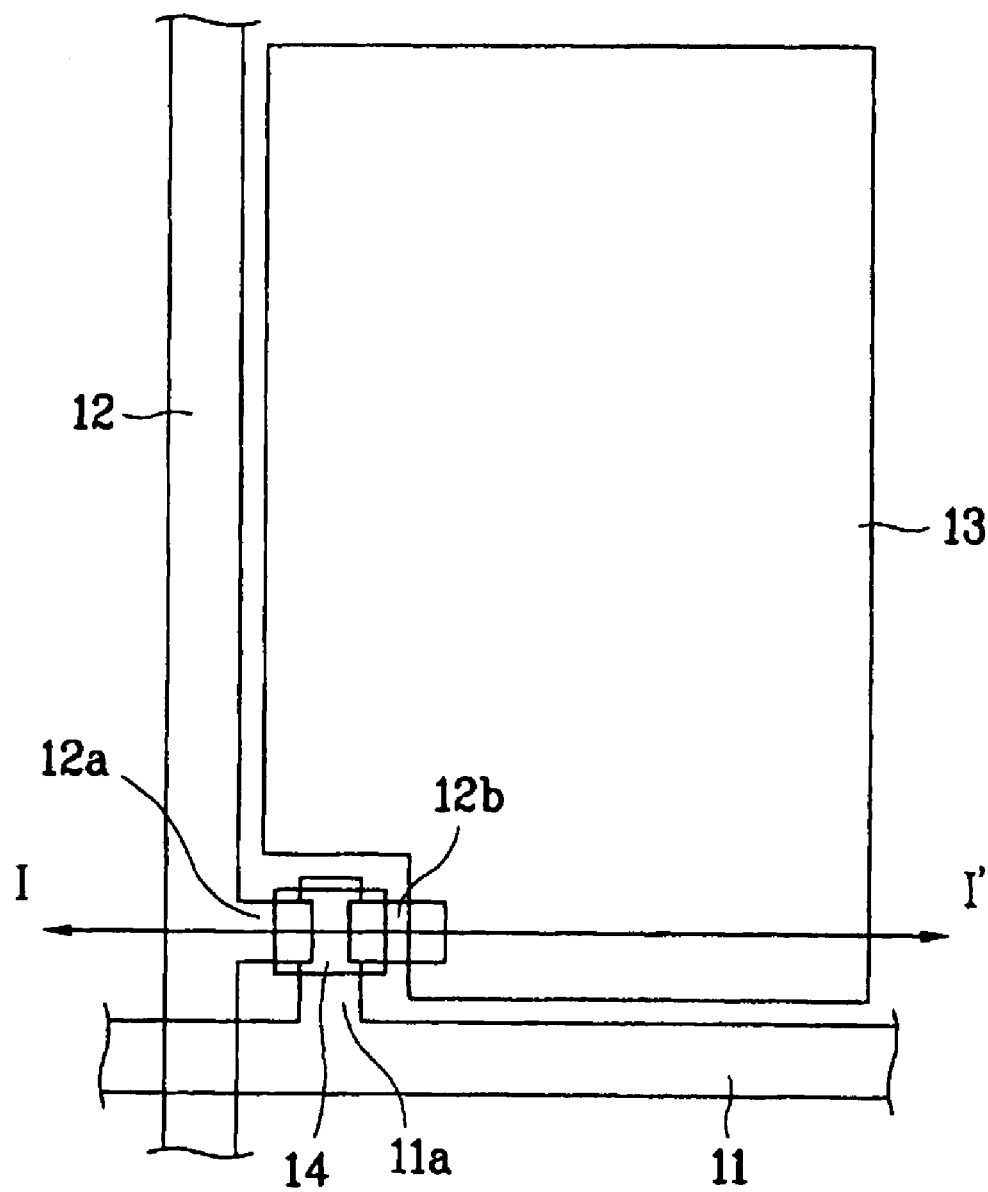
FIG. 1 is a plan view of a transmissive-type liquid crystal display (LCD) device according to the related art.
Figure 2:
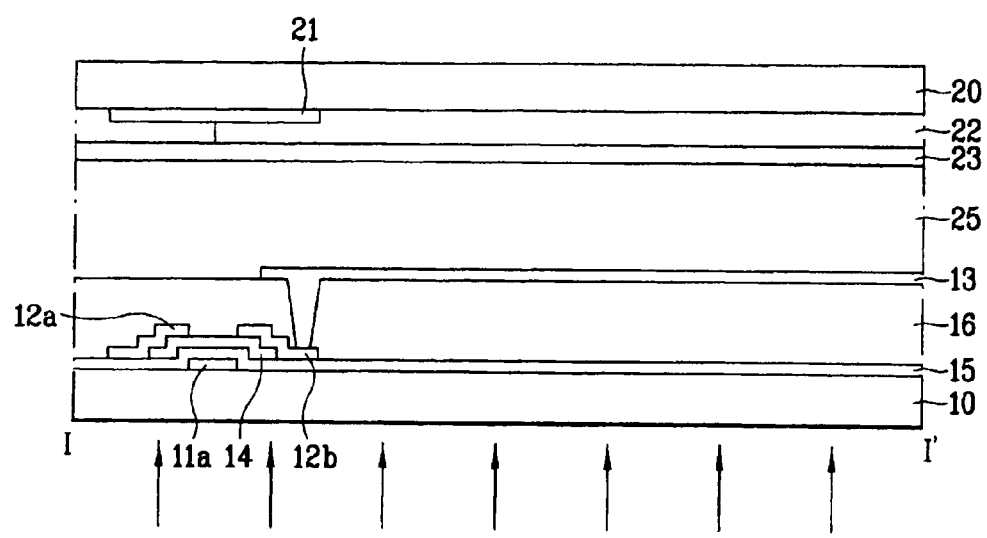
FIG. 2 is a cross sectional view along I–I' of FIG. 1 according to the related art.
Figure 3:
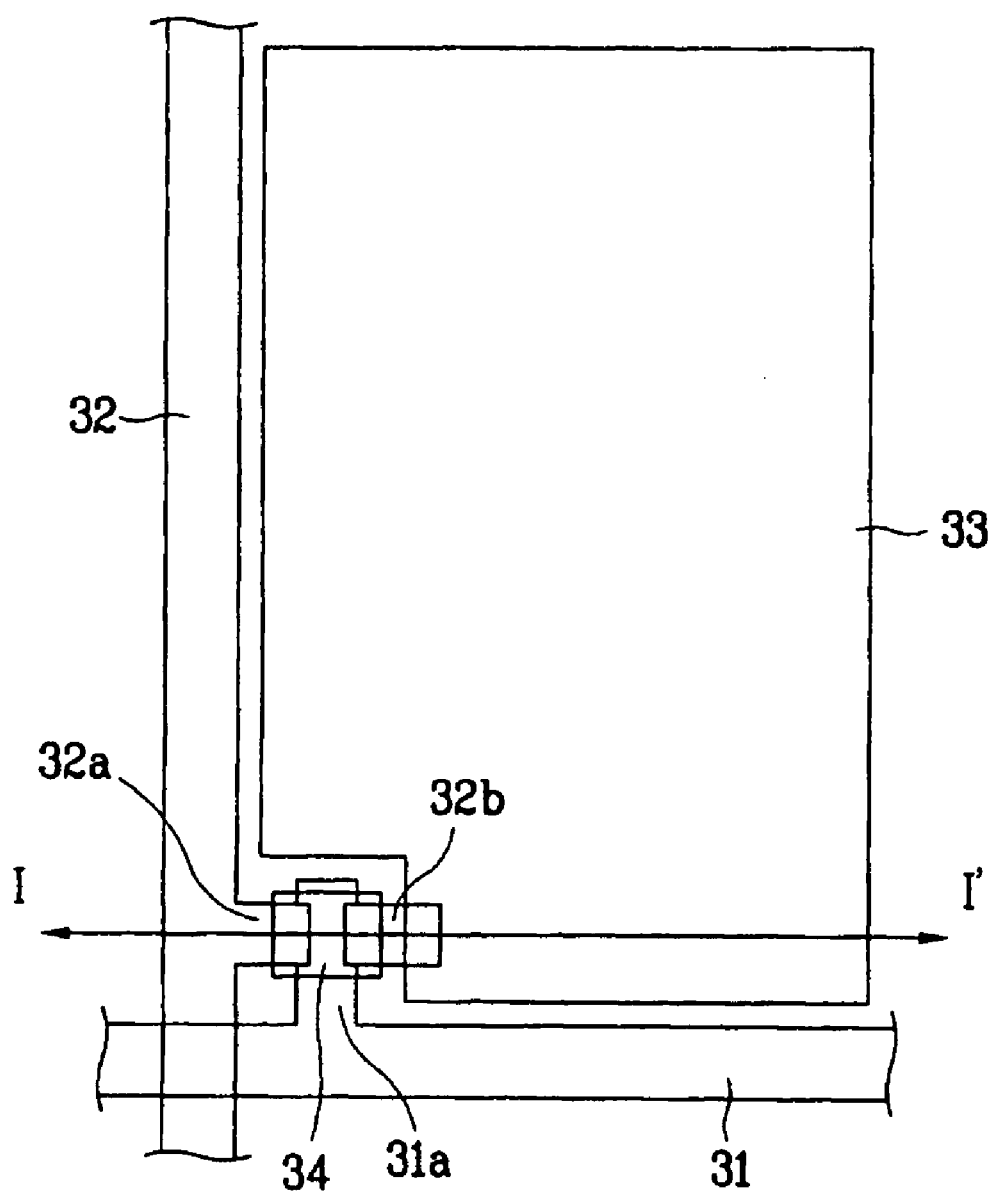
FIG. 3 is a plan view of an exemplary transmissive-type LCD device according to the present invention.
Figure 4:
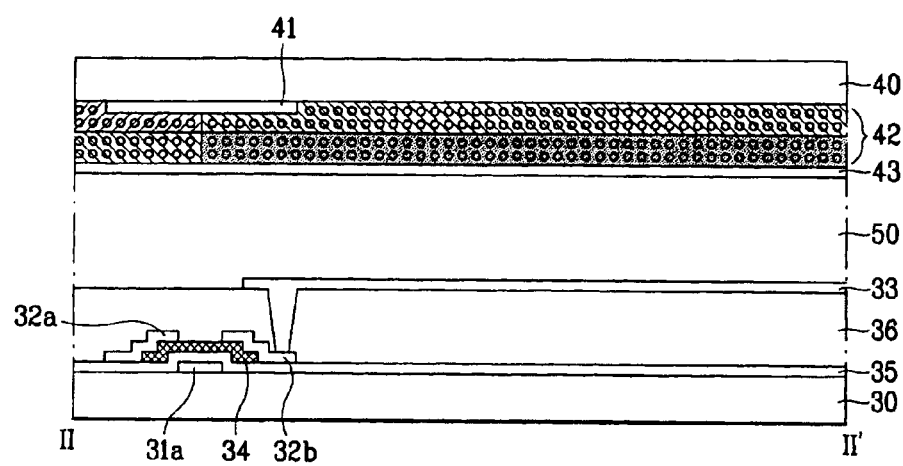
FIG. 4 is a cross sectional view along II–II' of FIG. 3 according to the present invention.

FIG. 3 is a plan view of an exemplary transmissive-type LCD device according to the present invention, and FIG. 4 is a cross sectional view along II–II' of FIG. 3 according to the present invention. In FIGS. 3 and 4, a transmissive-type LCD device may include a lower substrate 30 having a TFT array, an upper substrate 40 having a color filter 42 that may include a plurality of photonic crystal balls each corresponding to transmissible wavelengths, and a liquid crystal layer 50 disposed between the lower and upper substrates 30 and 40.

In FIG. 4, the lower substrate 30 may include a gate line 31, a data line 32, a pixel electrode 33, and a thin film transistor, wherein a gate electrode 31a may protrude from a predetermined portion of the gate line 31, and the data line 32, which may including source/drain electrodes 32a and 32b, may be formed perpendicular to the gate line 31. In addition, the pixel electrode 33 may be formed within a pixel region defined by a crossing of the gate and data lines 31 and 32. The thin film transistor may be formed at the crossing of the gate and data lines 31 and 32, and may be turned ON/OFF according to scanning signals transmitted along the gate line 31 so as to supply data signals transmitted along the data line 32 to the pixel electrode 33.

As shown in FIG. 4, the thin film transistor may include a gate insulating layer 35, a semiconductor layer 34, and the source/drain electrodes 32a and 32b. For example, the gate insulating layer 35 may be formed along an entire surface of the lower substrate 30 including the gate electrode 31a and the gate line 31, and the semiconductor layer 34 may be formed on the gate insulating layer 35 above the gate electrode 31a. In addition, the source/drain electrodes 32a and 32b may be formed at both sides of a channel region of the semiconductor layer 34.

Next, a passivation layer 36 may be formed along an entire surface of the lower substrate 30, including the source/drain electrodes 32a and 32b and the data line 32. Then, a contact hole may be formed in the passivation layer 36 to expose a portion of the drain electrode 32b, whereby the pixel electrode 33 may be electrically connected with the drain electrode 32b. The gate insulating layer 35 and the passivation layer 36 may be formed of an inorganic insulating material, such as $SiO_x$ or $SiN_x$, or an organic insulating material having a low dielectric constant, such as photoacryl, BCB (BenzoCycloButene), or polyamide compound.

The upper substrate 40 may include a black matrix layer 41 for shielding portions of the lower substrate 30, except for the pixel regions, from the light, the color filter layer 42 may be formed in the respective pixel regions corresponding to the pixel electrodes 33 to produce various colors, and a common electrode 43 may be formed along an entire surface of the upper substrate 40 including the color filter layer 42. Then, the liquid crystal layer 50 may be formed between the lower and upper substrate 30 and 40. Alternatively, the liquid crystal layer 50 may be formed on one of the lower and upper substrates 30 and 40.

Figure 5:
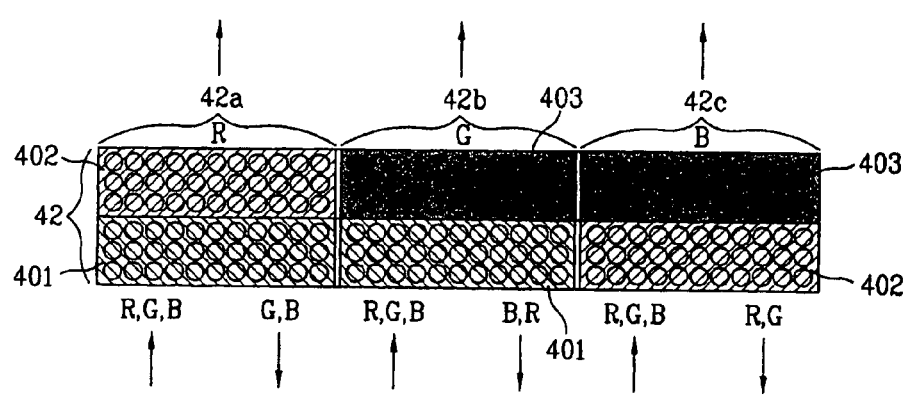
FIG. 5 is a cross sectional view of an exemplary color filter layer according to the present invention.

FIG. 5 is a cross sectional view of an exemplary color filter layer according to the present invention. In FIG. 5, a color filter layer 42 may include first, second, and third filter parts 42a, 42b, and 42c for reflecting red (R), green (G), and blue (B) colored light, respectively. The first, second, and third filter parts 42a, 42b, and 42c of the color filter layer 42 may be formed to correspond to the pixel electrodes 33 (in FIGS. 3 and 4). For example, the first filter part 42a may be formed of photonic crystal balls for reflecting light having wavelengths other than red wavelengths so as to transmit the light having the red wavelengths. Similarly, the second filter part 42b may also be formed of photonic crystal balls for reflecting light having wavelengths other than green wavelengths so as to transmit the light having the green wavelengths. Furthermore, the third filter 42c part may be formed of photonic crystal balls for reflecting light having wavelengths other than the blue wavelengths so as to transmit the light having the blue wavelengths.

In FIG. 5, the first filter part 42a may be comprised of a first filter layer 401 including the photonic crystal balls for reflecting light having the blue wavelengths, and a second filter layer 402 may include the photonic crystal balls for reflecting light having the green wavelengths. The second filter part 42b may be comprised of the first filter layer 401 including the photonic crystal balls for reflecting light having the blue wavelengths, and a third filter layer 403 including the photonic crystal balls for reflecting light having the red wavelengths. The third filter part 42c may be comprised of the second filter layer 402 including the photonic crystal balls for reflecting light having the green wavelengths, and the third filter layer 403 including the photonic crystal balls for reflecting light having the red wavelengths. In addition, viscous resin material may be mixed with the photonic crystal balls so that the photonic crystal balls may be fixed and packed within each of the first, second, and third filter layers 401, 402, and 403.

For example, the first filter layer 401 may reflect light having the blue wavelengths, and may transmit light having other wavelengths. Accordingly, the first filter layer 401 may be formed of the first photonic crystal balls, such as a metal material, for reflecting light having the blue wavelengths. The first photonic crystal balls may have diameters of about 240 nm (i.e., about 230 nm to about 250 nm) that are one-half the blue wavelengths, i.e., about 480 nm. The plurality of first photonic crystal balls may be formed along a first direction as a plurality of individual layers in a grid configuration. In the grid configuration, the respective individual layers of the first photonic crystal balls may be formed in fixed intervals corresponding to the diameters of the first photonic crystal balls.

Furthermore, the second filter layer 402 may reflect light having the green wavelengths, and may transmit light having other wavelengths. Accordingly, the second filter layer 402 may be formed of the second photonic crystal balls, such as a metal material, for reflecting light having the green wavelengths. The second photonic crystal balls may have diameters of about 275 nm (i.e., about 265 nm to about 285 nm) that are one-half of the green wavelengths, i.e., about 550 nm. The plurality of second photonic crystal balls may be formed along a first direction as a plurality of individual layers in a grid configuration. In the grid configuration, the respective individual layers of the second photonic crystal balls may be formed in fixed intervals corresponding to the diameters of the second photonic crystal balls.

Furthermore, the third filter layer 403 may reflect light having the red wavelengths, and may transmit light having other wavelengths. Accordingly, the third filter layer 403 may be formed of the third photonic crystal balls, such as a metal material, for reflecting light having the red wavelengths. The third photonic crystal balls may have diameters of about 305 nm, (i.e., about 295 nm to about 315 nm), that are one-half value of the red wavelengths, i.e., about 610 nm. The plurality of third photonic crystal balls may be formed along a first direction as a plurality of individual layers in a grid configuration. In the grid configuration, the respective individual layers of the third photonic crystal balls may be formed in fixed intervals corresponding to the diameters of the third photonic crystal balls.

According to Bragg's Equation ($\sin \theta = \lambda/2d$), when light has an incident angle ($\theta$) of 90°, a particle having a diameter corresponding to one-half of the wavelength ($\lambda$) of the incident light may be used to totally reflect the light. Thus, each of the first, second, and third photonic crystal balls may have diameters corresponding to one-half of the corresponding wavelengths to reflect the light having the corresponding wavelengths, and to transmit the light having other wavelengths.

In FIGS. 4 and 5, the color filter layer 42 may include two filter layers within each of the first, second, and third filter parts 42a, 42b, and 42c may be formed according to a method for forming a general color filter. For example, the filter layer 42 may include photonic crystal balls for reflecting light having specific wavelengths, and may be formed along an entire surface of the upper substrate 40 including the black matrix layer 41. Then, when it is required to transmit a specific wavelength of light within one filter portion, one filter layer including the photonic crystal balls may be removed therefrom, whereas the other filter layers may remain.

For example, as shown in FIG. 5, the first filter layer 401 including the photonic crystal balls for reflecting light having the blue wavelengths may be formed along an entire surface of the upper substrate 40, wherein the first filter layer 401 may remain only on the first and second filter parts 42a and 42b. Subsequently, the second filter layer 402 including the photonic crystal balls for reflecting light having the green wavelengths may be formed along an entire surface of the upper substrate 40 including the first filter layer 401, wherein the second filter layer 402 may remain only on the first and third filter parts 42a and 42c. Next, the third filter layer 403 including the photonic crystal balls for reflecting light having the red wavelengths may be formed along an entire surface of the upper substrate 40, wherein the third filter layer 403 may remain only on the second and third filter parts 42b and 42c.

During formation of the dual-layered color filter layers, masks may be necessary for covering each of the first, second, and third filter parts 42a, 42b, and 42c. For example, three masks may be necessary to form the color filter layer 42. In addition, it may be possible to inversely position the two layers of the color filter layer 42 along vertical directions. For example, the color filter layer 42 may including positioning the two different filter layers (401/402, 401/403 or 402/403) within one filter part, wherein the two filter layers may include the photonic crystal balls for reflecting light having the different wavelengths except the specific wavelengths desired to transmit the colored light. Thus, inversion of the two layers of the color filter layer 42 may be obtained along the vertical directions.

Within each of the first, second, and third filter parts 42a, 42b, and 42c, the photonic crystal balls may have a plurality of nano-particles each having a photonic bandgap energy of the specific wavelength in the grid configuration. Accordingly, it may be possible to determine a wavelength range of the light reflected in one filter part by controlling a size of the nano-particles.

According to the present invention, the photonic crystal balls may be substituted for pigments of the color filter layer of the related art. For example, the photonic crystal balls may reflect light having the specific wavelength, and may transmit light having other wavelengths, except for the specific wavelength, thereby improving the light efficiency. Thus, the color filter layer 42 may be formed of the photonic crystal balls of the two layers in each of the first, second, and third filter parts 42a, 42b, and 42c to reflect light having other wavelengths, except for the specific wavelength, thereby transmitting the light having the specific wavelength. Thus, it may be possible to use the total amount of light emitted from the backlight, thereby maximizing the light efficiency of the backlight. In addition, the light reflected by the photonic crystal balls within each of the first, second, and third filter parts 42a, 42b, and 42c of the color filter layer 42 may be used in the other filter parts, whereby the light emitted from the backlight may be used without any significant loss of light efficiency.

Moreover, although not shown, an anti-reflective coating (ARC) layer may be formed on a rear side of the upper substrate 40, wherein the photonic crystal balls may prevent external light from being reflected according to the specific wavelengths. In addition, although the color filter layer 42 may be formed on the upper substrate 40, it may be possible to form the color filter layer 42 on the lower substrate 40.

According to the present invention, the color filter may be applied to all of the various types of display devices that use an inner light source. Thus, it may be possible to use the light emitted from the inner light source to display colored light having the specific wavelengths.

It will be apparent to those skilled in the art that various modifications and variations can be made in the transmissive-type LCD device and method of fabricating a transmissive-type LCD device of the present invention. Thus, it is intended that the present invention covers the modifications and variations of this invention provided they come within the scope of the appended claims and their equivalents.

What is claimed is:

1. A transmissive-type liquid crystal display (LCD) device, comprising:
   lower and upper substrates facing each other;
   a thin film transistor array having a pixel electrode within each pixel region defined on the lower substrate;
   a black matrix layer on the upper substrate corresponding to portions of the lower substrate, except for the pixel electrode;
   a color filter layer on the upper substrate corresponding to the pixel electrode of the lower substrate, the color filter layer having a first region transmitting red wavelengths of light, a second region transmitting green wavelengths of light, and a third region transmitting blue wavelengths of light, the first region includes photonic crystal balls having first diameters and second diameters different from each other, the second region includes photonic crystal balls having the first diameters and third diameters different from the first and second diameters, and the third region includes photonic crystal balls having the second diameters and the third diameters; and
   a liquid crystal layer between the lower and upper substrates.

2. The device according to claim 1, further comprising a common electrode along an entire inner surface of the upper substrate covering the black matrix layer and the color filter layer.

3. The device according to claim 1, further comprising an anti-reflective coating layer on a rear surface of the upper substrate.

4. The device according to claim 1, wherein the first, second, and third regions are serially formed to correspond to respective pixel electrodes.

5. The device according to claim 1, wherein the first diameters correspond to one-half of the blue wavelengths of light, and the second diameters correspond to one-half of the green wavelengths of light.

6. The device according to claim 5, wherein the first diameters are within a range of about 230 nm to about 250 nm, and the second diameters are within a range of about 265 nm to about 285 nm.

7. The device according to claim 1, wherein the first diameters correspond to one-half of the blue wavelengths of light, and the third diameters correspond to one-half of the red wavelengths of light.

8. The device according to claim 7, wherein the first diameters are within a range of about 230 nm to about 250 nm, and the third diameters are within a range of about 295 nm to about 315 nm.

9. The device according to claim 1, wherein the second diameters correspond to one-half of the green wavelengths, and the third diameters correspond to one-half of the red wavelengths.

10. The device according to claim 9, wherein the second diameters are within a range of about 265 nm to about 285 nm, and the third diameters are within a range of about about 295 nm to about 315 nm.

11. A method of fabricating a transmissive-type liquid crystal display (LCD) device, comprising:
   forming a thin film transistor array having a pixel electrode within each pixel region defined on a lower substrate;
   forming a black matrix layer on an upper substrate corresponding to portions of the lower substrate, except for the pixel electrode;
   forming a color filter layer on the upper substrate corresponding to the pixel electrode of the lower substrate, the color filter layer having a first region transmitting red wavelengths of light, a second region transmitting blue wavelengths of light, and a third region transmitting green wavelengths of light, the first region includes photonic crystal balls having first diameters and second diameters different from each other, the second region includes photonic crystal balls having the first diameters and third diameters different from the first and second diameters, and the third region includes photonic crystal balls having the second diameters and the third diameters; and
   forming a liquid crystal layer between the lower and upper substrates.

12. The method according to claim 11, further comprising forming a common electrode along an entire inner surface of the upper substrate to cover the black matrix layer and the color filter layer.

13. The method according to claim 11, further comprising forming an anti-reflective coating layer on a rear surface of the upper substrate.

14. The method according to claim 11, wherein the first, second, and third regions are serially formed to correspond to respective pixel electrodes.

15. The method according to claim 11, wherein the first diameters correspond to one-half of the blue wavelengths of light, and the second diameters correspond to one-half of the green wavelengths of light.

16. The method according to claim 15, wherein the first diameters are within a range of about 230 nm to about 250 nm, and the second diameters are within a range of about 265 nm to about 285 nm.

17. The method according to claim 11, wherein the first diameters correspond to one-half of the blue wavelengths of light, and the third diameters correspond to one-half of the red wavelengths of light.

18. The method according to claim 17, wherein the first diameters are within a range of about 230 nm to about 250 nm, and the third diameters are within a range of about 295 nm to about 315 nm.

19. The method according to claim 11, wherein the second diameters correspond to one-half of the green wavelengths, and the third diameters correspond to one-half of the red wavelengths of light.

20. The method according to claim 19, wherein the second diameters are within a range of about 265 nm to about 285 nm, and the third diameters are within a range of about about 295 nm to about 315 nm.

21. A color filter for transmitting and reflecting different first, second, and third wavelengths, comprising:
   a first filter part having photonic crystal balls including first diameters and second diameters different from the first diameters for reflecting light having the second and third wavelengths and for transmitting light having only the first wavelengths of the first, second, and third wavelengths;
   a second filter part having photonic crystal balls including the first diameters and third diameters different from the first and second diameters for reflecting light having the first and third wavelengths and for transmitting light having only the second wavelengths of the first, second, and third wavelengths; and
   a third filter part having photonic crystal balls including the second diameters and the third diameters for reflecting light having the first and second wavelengths and for transmitting light having only the third wavelengths of the first, second, and third wavelengths.

22. The color filter according to claim 21, wherein the first filter part includes a first filter layer having the photonic crystal balls each having the first diameters for reflecting the light having the third wavelengths, and a second filter layer having the photonic crystal balls each having the second diameters for reflecting the light having the second wavelengths.

23. The color filter according to claim 21, wherein the second filter part includes a first filter layer having the photonic crystal balls each having the first diameters for reflecting the light having the third wavelengths, and a third filter layer having the photonic crystal balls each having the third diameter for reflecting the light having the first wavelengths.

24. The color filter according to claim 21, wherein the third filter part includes a second filter layer having the photonic crystal balls each having the second diameters for reflecting the light having the second wavelengths, and a third filter layer having the photonic crystal balls each having the third diameters for reflecting the light having the first wavelengths.

25. The color filter according to claim 21, wherein the first diameters correspond to one-half of the third wavelengths, and the second diameters correspond to one-half of the second wavelengths.

26. The color filter according to claim 25, wherein the first diameters are within a range of about 230 nm to about 250 nm, and the second diameters are within a range of about 265 nm to about 285 nm.

27. The color filter according to claim 21, wherein the second diameters correspond to one-half of the third wavelengths, and the third diameters correspond to one-half of the first wavelengths.

28. The color filter according to claim 27, wherein the first diameters are within a range of about 230 nm to about 250 nm, and the third diameters are within a range of about 295 nm to about 315 nm.

29. The color filter according to claim 21, wherein the third diameters correspond to one-half of the second wavelengths, and the third diameters correspond to one-half of the first wavelengths.

30. The color filter according to claim 29, wherein the second diameters are within a range of about 265 nm to about 285 nm, and the third diameters are within a range of about 295 nm to about 315 nm.

31. A method of fabricating a color filter, comprising:
   forming a first filter part having photonic crystal balls including first diameters and second diameters different from the first diameter for reflecting light having first wavelengths and transmitting light having only red wavelengths;
   forming a second filter part having photonic crystal balls including the first diameters and third diameters different from the first and second diameters for reflecting light having second wavelengths and for transmitting light having only green wavelengths; and
   forming a third filter part having photonic crystal balls including the second diameters and the third diameters for reflecting light having third wavelengths and transmitting light having only blue wavelengths.

32. The method according to claim 31, wherein the first filter part includes a first filter layer having the photonic crystal balls each having the first diameters for reflecting the light having the blue wavelengths, and a second filter layer having the photonic crystal balls each having the second diameters for reflecting the light having the green wavelengths.

33. The method according to claim 31, wherein the second filter part includes a first filter layer having the photonic crystal balls each having the first diameters for reflecting the light having the blue wavelengths, and a third filter layer having the photonic crystal balls each having the third diameters for reflecting the light having the red wavelengths.

34. The method according to claim 31, wherein the third filter part includes a second filter layer having the photonic crystal balls each having the second diameters for reflecting the light having the green wavelengths, and a third filter layer having the photonic crystal balls each having the third diameters for reflecting the light having the red wavelengths.

35. The method according to claim 31, wherein the first diameters are within a range of about 230 nm to about 250 nm, the second diameters are within a range of about 265 nm to about 285 nm, and the third diameters of are within a range of about 295 nm to about 315 nm.

\* \* \* \* \*